Dec. 23, 1958     J. GOLDSTEIN     2,865,315
HAND BULB PLANTER
Filed Aug. 19, 1954
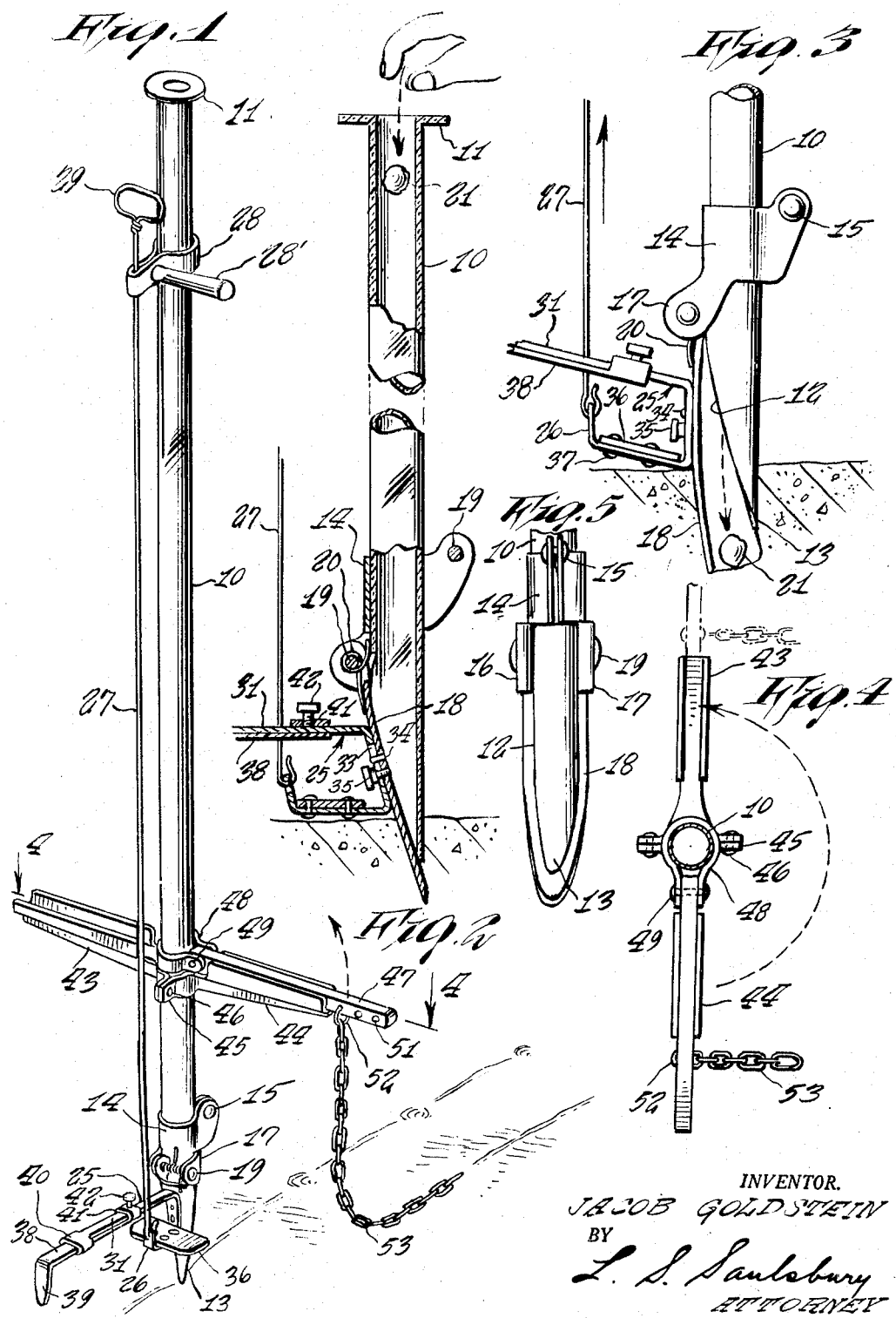
INVENTOR.
JACOB GOLDSTEIN
BY
L. S. Saulsbury
ATTORNEY

United States Patent Office 2,865,315
Patented Dec. 23, 1958

2,865,315

HAND BULB PLANTER

Jacob Goldstein, Brooklyn, N. Y.

Application August 19, 1954, Serial No. 450,975

1 Claim. (Cl. 111—92)

This invention relates to a hand bulb planter.

It is the primary object of the present invention to provide a hand bulb planter that can be used by the operator from a standing position.

It is another object of the invention to provide a hand bulb planter wherein one of the parts which penetrates the soil is longer and wider than the other part so as to assume the wear of the thrust of the planter into the soil and to allow the other part to be relatively soft transparent plastic material.

It is another object of the invention to provide a hand bulb planter having soil penetrating members shaped much like the bill of a bird and one member longer than the other so that upon opening the members a pocket is made by the one member below the end of the other member suitable to receive the bulb free of the other member whereby the member is closed once the bulb has been planted and pulled from the ground without lifting the bulb with it.

It is another object of the invention to provide a hand bulb planter adapted to penetrate the soil and which has on it means for marking the location for the next bulb in the row and also the next row as the operator proceeds with the planting of the first row.

It is another object of the invention to provide a hand bulb planter having a bracket to which a depth gauge, a marker and pull rod are attached, and means by which such assembly may be connected to the movable jaw as a unit and in an adjustable manner.

It is another object of the invention to provide a row marking device which is adjustable to one side or the other of the planter tube so that rows may be marked on either side while advancing the planting in a row.

Other objects of the invention are to provide a hand bulb planter which is of simple construction, inexpensive to manufacture, has a minimum number of parts, light in weight, easy to operate, has a transparent delivery tube, durable, compact and efficient in operation.

For other objects and a better understanding of the invention, reference may be had to the following detailed description taken in connection with the accompanying drawing, in which:

Figure 1 is a perspective view of the planter embodying the features of the present invention, the planter being in the planting position and the row marker set for operation;

Fig. 2 is an enlarged fragmentary elevational view of the planter with portions broken away and shown in section and illustration as to the manner in which the seed bulb is fed to the planter;

Fig. 3 is a fragmentary elevational view of the lower end of the planter upon the same having been thrust into the ground and the movable pointed or bill member opened to allow the bulb to be dropped from the planter below the end of the other member;

Fig. 4 is a transverse sectional view taken on line 4—4 of Fig. 1 and of the chain drag marker serving to mark the new row.

Fig. 5 is a perspective view of the lower end of the planter showing the difference in width and length of the outer bill member from the pointed lower end of the tube serving as the other member.

Referring now to the figures, 10 represents a long tube, preferably formed of transparent plastic, having a flange 11 on its upper end over which a garlic, onion flower or other bulb is fed into the tube. The lower end of the tube is cut away on one side as indicated at 12 to provide a pointed end 13 adapted to penetrate the soil. Fitted over the lower end of the tube, just above cut away portion 12, is a clamp bracket 14 which is secured to the tube by fastening bolt means 15. On the front of the bracket 14 are spaced lugs 16 and 17 between which is hinged a movable bill member 18 adapted to close the cut opening 12 on the lower end of the tube 10 and which is pointed to penetrate the soil along with the pointed end 13 of the tube. The pivot connection is effected through a hinge pin 19. Two spiral springs 20 surround the hinge pin and react between the bill or closure member 18 and the clamp bracket 14 to normally maintain the bill member closed upon the pointed lower end 13 of the tube 10. The bill member 18 is made of hard metal and is wider and longer than the cutaway edge of the plastic tube 10 so as to protect the relatively soft tube and assume the wear of the pointed lower end 13 of the tube 10. Bill member 18 projects below the pointed end 13 of the tube 10 and is wider than it so that an opening is made in the soil as the bill member is opened, as illustrated in Fig. 3, to accommodate a bulb 21 free of the lower end 13 of the tube 10. The bill member 18 may be closed without gripping the bulb before the planter is retracted so that the bulb will be covered.

To open the bill member 18 against the action of the springs 20, a multi-purpose bracket 25 is adjustably secured to the bill member 18, and it has a turned up lower arm 26 to which an operating rod 27 is connected. This operating rod 27 extends upwardly through a guide and supporting bracket 28 with a grip handle 28' on the upper end of the tube 10. A pull handle 29 is connected to the upper end of the rod 27 and by means of this handle the bill member 18 is pivoted outwardly upon the hinge pin 19 against the action of springs 20 so as to allow the bulb 21 to be deposited in the soil in the manner indicated in Fig. 3. Thereafter, the handle 29 is released to allow the bill member 18 to close and the planter is pulled from the ground.

The bracket 25 has an upper long arm 31 and an intermediate portion 32 having an elongated slot 33 therein. On the bill member 18 is a pin projection 34 that enters the slot 33 to hold the bracket against lateral displacement. A thumb screw 35 extends through the slot into a threaded opening in the member 18 so as to hold the bracket 25 in a vertically-adjusted position.

Upon the lower arm 26 of the bracket, there is fixed a depth gauge plate 36 by means of rivets 37. This plate 36 serves as a depth gauge for the planter. An adjustment of the depth gauge plate can be effected by moving the bracket to different elevated locations upon the bill member 18. The entire assembly can be adjusted on the bill member as a unit.

In order to mark the soil for the insertion of the next bulb, an adjustable arm 38 having a bent down end 39 is slidable upon the long arm 31. The end of the long arm 31 has a guide portion 40 to hold the adjustable arm 38 against lateral displacement. This arm 38 on its inner end has a guide portion 41 with a thumb screw 42 which can be tightened to clamp the adjustable arm 38 in its adjusted position upon the long arm 31 of the bracket 25.

As the planter is inserted in the ground to deposit the bulb, the tube 10 is turned so that the bent down end 39 of the arm 38 may be turned slightly to make a mark in the soil at the point where the next bulb is to be received. This mark will also be effected as the rod 27 is pulled upwardly to open the bill member 18 without turning the planter.

The row marking device consists of two channel parts 43 and 44 adapted to opposingly engage the side of the tube. These parts have side lugs 45 and are held tightly clamped upon the tube by fastening bolts 46 extending through the side lugs.

A swing arm 47 is slidably connected at one end by slide clamp 48 to the tube. The swing arm is pivoted to this clamp 48 by a pivot pin 49. The clamp 48 is slidable upon the tube and upon being elevated the swing arm 47 can be turned on the tube to be pushed into the other channel member on the opposite side of the tube. The outer end of the swing arm has a plurality of holes 51 into which a chain link 52 of a chain 53 can be fitted.

As the planter is moved along the row, the chain 53 will drag along the ground surface and make a marking to indicate the location of the next row.

While various changes may be made in the detail construction, it shall be understood that such changes shall be within the spirit and scope of the present invention as defined by the appended claims.

What is claimed is:

A bulb planter comprising an elongated hollow tube having its lower end cut away diagonally as an opening to provide a pointed penetrating end for the tube, a clamp bracket securely mounted on the tube just above and adjacent the diagonal opening and having a pair of spaced lugs, a bill-shaped closure member for the cut-away opening pivotally mounted between the lugs on a hinge pin, spiral spring means mounted around the pin with one end bearing against the tube and the other end against the closure member to urge the latter to close the opening in the tube, a bracket means adjustably mounted on said bill-shaped closure member and having upper and lower arms, said lower arm having means thereon serving as a gauge to limit penetration of the tube into the ground and the upper arm serving as a means to mount an accessory thereon, and a rod connected to the lower arm of the second-mentioned bracket and extending along the side of the tube in spaced relation to act as an actuating means for the bill-shaped closure member.

References Cited in the file of this patent

UNITED STATES PATENTS

| | | |
|---|---|---|
| 63,551 | Morris | Apr. 2, 1867 |
| 97,508 | Haynesworth | Dec. 7, 1869 |
| 209,611 | Everitt | Nov. 5, 1878 |
| 556,134 | Choate | Mar. 10, 1896 |
| 584,325 | Choate | June 15, 1897 |
| 833,130 | Ettinger | Oct. 9, 1906 |
| 909,289 | Grissell | Jan. 12, 1909 |
| 971,116 | Carter | Sept. 27, 1910 |
| 1,078,165 | Priset | Nov. 11, 1913 |
| 1,202,562 | Mintern | Oct. 24, 1916 |
| 1,439,601 | Boop | Dec. 19, 1922 |
| 1,780,055 | Zoulek | Oct. 28, 1930 |

FOREIGN PATENTS

| | | |
|---|---|---|
| 407,927 | Italy | Dec. 13, 1944 |